(12) United States Patent
Agranov et al.

(10) Patent No.: US 11,558,569 B2
(45) Date of Patent: Jan. 17, 2023

(54) GLOBAL-SHUTTER IMAGE SENSOR WITH TIME-OF-FLIGHT SENSING CAPABILITY

(71) Applicant: Apple Inc., Cupertino, CA (US)

(72) Inventors: Gennadiy Agranov, San Jose, CA (US); Thierry Oggier, Langnau am Albis (CH)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/324,144

(22) Filed: May 19, 2021

(65) Prior Publication Data

US 2021/0392283 A1 Dec. 16, 2021

Related U.S. Application Data

(60) Provisional application No. 63/037,626, filed on Jun. 11, 2020.

(51) Int. Cl.
*H04N 13/254* (2018.01)
*H04N 5/369* (2011.01)
(Continued)

(52) U.S. Cl.
CPC ......... *H04N 5/36965* (2018.08); *H04N 5/353* (2013.01); *H04N 5/378* (2013.01);
(Continued)

(58) Field of Classification Search
USPC ........................................................ 348/46
See application file for complete search history.

(56) References Cited

U.S. PATENT DOCUMENTS

| 4,471,785 A | 9/1984 | Wilson et al. |
| 7,379,163 B2 | 5/2008 | Rafii et al. |
(Continued)

FOREIGN PATENT DOCUMENTS

| CN | 108141528 A | * 6/2018 | ............... G02B 7/09 |
| EP | 3410486 A1 | 12/2018 | |
(Continued)

OTHER PUBLICATIONS

Alnahhas et al., U.S. Appl. No. 17/200,832, filed Mar. 14, 2021.
(Continued)

*Primary Examiner* — Behrooz M Senfi
(74) *Attorney, Agent, or Firm* — Kligler & Associates Patent Attorneys Ltd

(57) ABSTRACT

Apparatus for optical sensing includes first matrix of optical sensing elements, arranged on a semiconductor substrate in rows and columns. A second matrix of storage nodes is arranged on the substrate such that respective first and second storage nodes in the second matrix are disposed in proximity to each of the sensing elements within the first matrix. Switching circuitry couples each of the sensing elements to transfer photocharge to the respective first and second storage nodes. Control circuitry controls the switching circuitry in a depth sensing mode such that over a series of detection cycles, each of the sensing elements and a first neighboring sensing element are connected together to the respective first storage node during the first detection interval, and each of the sensing elements and the second neighboring sensing element are connected together to the respective second storage node during the second detection interval.

18 Claims, 12 Drawing Sheets

(51) Int. Cl.
*H04N 13/296* (2018.01)
*H04N 13/289* (2018.01)
*H04N 5/353* (2011.01)
*H04N 5/378* (2011.01)

(52) U.S. Cl.
CPC ......... *H04N 13/254* (2018.05); *H04N 13/289* (2018.05); *H04N 13/296* (2018.05)

(56) References Cited

U.S. PATENT DOCUMENTS

| | | | |
|---|---|---|---|
| 8,649,557 | B2 | 2/2014 | Hyung et al. |
| 8,989,455 | B2 | 3/2015 | Shor et al. |
| 9,467,633 | B2 | 10/2016 | Johnson et al. |
| 9,723,233 | B2 | 8/2017 | Grauer et al. |
| 9,898,074 | B2 | 2/2018 | Shpunt et al. |
| 10,061,028 | B2 | 8/2018 | Koppal et al. |
| 10,228,240 | B2 | 3/2019 | Trail |
| 10,229,502 | B2 | 3/2019 | Adam et al. |
| 10,274,377 | B1 | 4/2019 | Rabb et al. |
| 10,605,916 | B2 | 3/2020 | Molnar et al. |
| 10,616,519 | B2 | 4/2020 | Elkhatib et al. |
| 10,762,655 | B1 | 9/2020 | Lindskog et al. |
| 10,929,997 | B1 | 2/2021 | Hall et al. |
| 2005/0145773 | A1* | 7/2005 | Hashimoto .............. H03D 9/00 257/E31.115 |
| 2006/0207978 | A1 | 9/2006 | Rizun et al. |
| 2009/0304294 | A1 | 12/2009 | Katsumoto et al. |
| 2010/0128960 | A1* | 5/2010 | Yumikake .............. A61B 3/102 382/133 |
| 2013/0329042 | A1 | 12/2013 | Murata et al. |
| 2014/0064555 | A1 | 3/2014 | Sebastian et al. |
| 2016/0109575 | A1 | 4/2016 | Oggier et al. |
| 2016/0119606 | A1 | 4/2016 | Horikawa |
| 2016/0198147 | A1 | 7/2016 | Waligorski et al. |
| 2017/0176579 | A1 | 6/2017 | Niclass et al. |
| 2017/0316602 | A1 | 11/2017 | Smirnov et al. |
| 2018/0067197 | A1 | 3/2018 | Schockaert et al. |
| 2018/0095165 | A1 | 4/2018 | Cohen et al. |
| 2018/0275278 | A1 | 9/2018 | Yamada |
| 2018/0366504 | A1* | 12/2018 | Jin ...................... H01L 27/1464 |
| 2019/0004156 | A1 | 1/2019 | Niclass et al. |
| 2019/0011562 | A1 | 1/2019 | Pacala et al. |
| 2019/0011567 | A1 | 1/2019 | Pacala et al. |
| 2019/0181169 | A1* | 6/2019 | Tadmor ................. G01S 7/4814 |
| 2019/0208118 | A1 | 7/2019 | Jasinski |
| 2019/0219696 | A1 | 7/2019 | Xu |
| 2019/0303551 | A1 | 10/2019 | Tussy |
| 2019/0331776 | A1 | 10/2019 | Aotake et al. |
| 2019/0363520 | A1 | 11/2019 | Laflaquiere et al. |
| 2020/0057151 | A1 | 2/2020 | Finkelstein et al. |
| 2020/0314376 | A1 | 10/2020 | Kim et al. |
| 2021/0048531 | A1 | 2/2021 | Medower et al. |
| 2021/0055419 | A1 | 2/2021 | Oggier et al. |

FOREIGN PATENT DOCUMENTS

| | | |
|---|---|---|
| EP | 3474038 A1 | 4/2019 |
| KR | 20190000052 A | 1/2019 |
| WO | 2018218298 A1 | 12/2018 |

OTHER PUBLICATIONS

International Application # PCT/US2021/033049 Search Report dated Sep. 8, 2021.
Naik et al., "A Light Transport Model for Mitigating Multipath Interference in Time-of-Flight Sensors", 2015 IEEE Conference on Computer Vision and Pattern Recognition (CVPR), pp. 1-9, Jun. 7-12, 2015.
Nayar et al., "Fast Separation of Direct and Global Components of a Scene using High Frequency Illumination", ACM Transactions in Graphics, vol. 23, issue 3, pp. 935-944, Jul. 2006.
Payne et al., "Multiple Frequency Range Imaging to Remove Measurement Ambiguity", Proceedings of 9th Conference on Optical 3-D Measurement Techniques, pp. 139-148, Jul. 1-3, 2009.
U.S. Appl. No. 16/914,513 Office Action dated Jul. 5, 2022.
U.S. Appl. No. 16/914,513 Office Action dated Oct. 21, 2022.

* cited by examiner

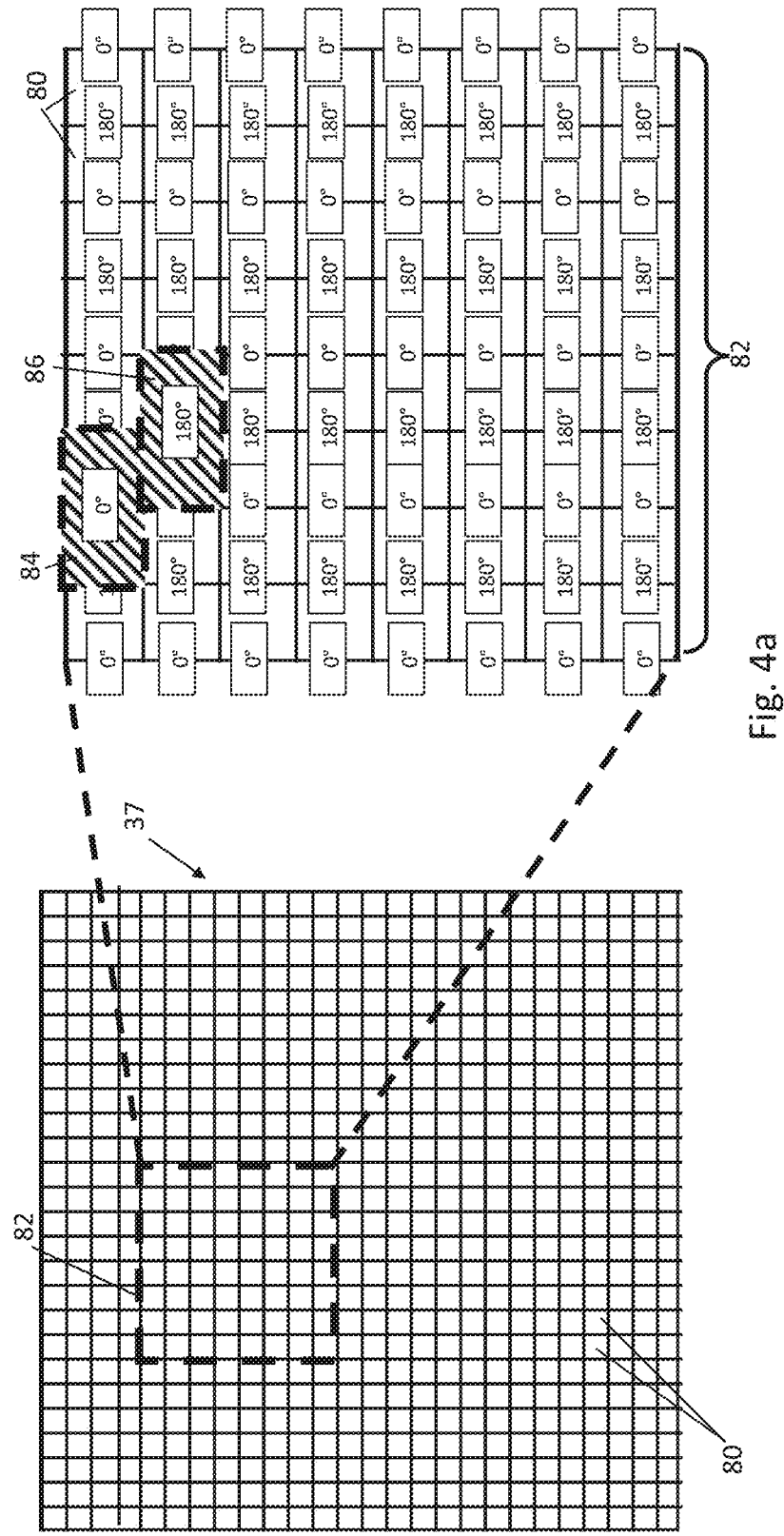

| sensing element | storage node | |
|---|---|---|
| | $SN_{i-1}$ | $SN_i$ |
| $PD_{i-1}$ | $TX_{i-1}^L$ | - |
| $PD_i$ | $TX_{i-1}^R$ | $TX_i^L$ |
| $PD_{i+1}$ | - | $TX_i^R$ |

Fig. 10

GLOBAL-SHUTTER IMAGE SENSOR WITH TIME-OF-FLIGHT SENSING CAPABILITY

CROSS-REFERENCE TO RELATED APPLICATION

This application claims the benefit of U.S. Provisional Patent Application 63/037,626, filed Jun. 11, 2020, which is incorporated herein by reference.

FIELD OF THE INVENTION

The present invention relates generally to imaging, and particularly to optical sensors for both two-dimensional imaging and depth mapping.

BACKGROUND

Some wearable and portable consumer devices, such as smartphones, augmented reality (AR) devices, virtual reality (VR) devices, and smart glasses, comprise both two-dimensional (2D) image sensors and optical depth mapping systems. The image sensor typically requires high spatial resolution in order to capture high-quality images. At the same time, the physical size of the sensor is limited due to the space requirements of these devices, leading to small pixel size. The optical depth mapping system may be used, for example, in conjunction with 2D imaging in order to perform reliable face recognition.

Various methods are known in the art for optical depth mapping, i.e., generating a three-dimensional (3D) profile of the surface of an object by processing optical radiation reflected from the object. This sort of 3D profile is also referred to as a 3D map, depth map or depth image, and depth mapping is also referred to as 3D mapping. (In the context of the present description and in the claims, the terms "optical radiation" and "light" are used interchangeably to refer to electromagnetic radiation in any of the visible, infrared, and ultraviolet ranges of the spectrum.)

Some depth mapping systems operate by measuring the time of flight (TOF) of radiation to and from points in a target scene. In direct TOF (dTOF) systems, a light transmitter, such as a laser or array of lasers, directs short pulses of light toward the scene. A receiver, such as a sensitive, high-speed photodiode (for example, an avalanche photodiode) or an array of such photodiodes, receives the light returned from the scene. Control circuitry measures the time delay between the transmitted and received light pulses at each point in the scene, which is indicative of the distance traveled by the light beam, and hence of the depth of the object at the point, and uses the depth data thus extracted in producing a 3D map of the scene.

Indirect TOF (iTOF) systems, on the other hand, operate by modulating the amplitude of an outgoing beam of radiation at a certain carrier frequency, and then measuring the phase shift of that carrier wave (at the modulation carrier frequency) in the radiation that is reflected back from the target scene. The phase shift can be measured by imaging the scene onto an optical sensor array, and gating or modulating the integration times of the sensors in the array in synchronization with the modulation of the outgoing beam. The phase shift of the reflected radiation received from each point in the scene is indicative of the distance traveled by the radiation to and from that point, although the measurement may be ambiguous due to range-folding of the phase of the carrier wave over distance.

SUMMARY

Embodiments of the present invention that are described hereinbelow provide apparatus and methods for optical depth sensing.

There is therefore provided, in accordance with an embodiment of the invention, apparatus for optical sensing, including a semiconductor substrate and a first matrix of optical sensing elements, arranged on the substrate in rows and columns such that any given sensing element within the first matrix has first and second neighboring sensing elements on different sides of the given sensing element in the first matrix. A second matrix of storage nodes is arranged on the substrate such that respective first and second storage nodes in the second matrix are disposed in proximity to each of the sensing elements within the first matrix. Switching circuitry is configured to couple each of the sensing elements to transfer photocharge to the respective first and second storage nodes. Control circuitry is configured to control the switching circuitry in a depth sensing mode such that over a series of detection cycles including at least first and second detection intervals in each cycle, each of the sensing elements and the first neighboring sensing element are connected together to the respective first storage node during the first detection interval, and each of the sensing elements and the second neighboring sensing element are connected together to the respective second storage node during the second detection interval. Readout circuitry is configured to output the photocharge from the storage nodes.

In some embodiments, the apparatus includes an illumination assembly, which is configured to direct optical radiation toward a target scene while modulating the optical radiation with a carrier wave having a predetermined carrier frequency, and objective optics, which are configured to image the target scene onto the first matrix of optical sensing elements. The control circuitry is configured to synchronize the detection cycles with the carrier frequency. In some of these embodiments, the control circuitry is configured to compare the photocharge output by the readout circuitry from the first and second storage nodes in order to compute depth coordinates of points in the target scene.

In some embodiments, the control circuitry is configured to vary respective phases of the first and second detection intervals relative to the carrier wave over the series of the detection cycles, and to compute the depth coordinates using the photocharge output over the varying phases. In one embodiment, the first and second detection intervals have phases that are 180° apart relative to the carrier wave. In a disclosed implementation, the control circuitry is configured to control the switching circuitry so that the first and second detection intervals have phases of 0° and 180° relative to the carrier wave, and so that the storage nodes in at least some of the rows in the matrix collect the photocharge in third and fourth detection intervals having phases of 90° and 270° relative to the carrier wave.

Alternatively, the control circuitry is configured to control the switching circuitry so that the first and second detection intervals have phases of 0° and 180° relative to the carrier wave, and so that the storage nodes in at least some of the rows in the matrix collect the photocharge in third, fourth, fifth and sixth detection intervals having phases of 60°, 120°, 240° and 300° relative to the carrier wave.

Additionally or alternatively, the phases of the first and second detection intervals are reversed from row to row in successive rows of the second matrix.

In some embodiments, the control circuitry is further configured to control the switching circuitry in a two-dimensional (2D) sensing mode such that each of the sensing elements is connected individually to a single, respective one of the storage nodes that is in proximity thereto. In one embodiment, the switching circuitry includes shutter gates coupled to apply a global shutter to the sensing elements in the 2D sensing mode.

Additionally or alternatively, the switching circuitry includes first and second transfer switches coupled respectively between each of the sensing elements and the respective first and second storage nodes.

In some embodiments, the optical sensing elements are arranged such that the first and second neighboring sensing elements of any given sensing element within any given row of the first matrix are disposed on opposing sides of the given sensing element along the given row. In a disclosed embodiment, the storage nodes are interleaved with the sensing elements along the rows of the first matrix.

There is also provided, in accordance with an embodiment of the invention, a method for optical sensing, which includes arranging a first matrix of optical sensing elements on a semiconductor substrate in rows and columns such that any given sensing element within the first matrix has first and second neighboring sensing elements on different sides of the given sensing element in the first matrix. A second matrix of storage nodes is arranged on the substrate such that respective first and second storage nodes in the second matrix are disposed in proximity to each of the sensing elements within the first matrix. Each of the sensing elements is coupled to transfer photocharge via switching circuitry to the respective first and second storage nodes. The switching circuitry is controlled in a depth sensing mode such that over a series of detection cycles including at least first and second detection intervals in each cycle, each of the sensing elements and the first neighboring sensing element are connected together to the respective first storage node during the first detection interval, and each of the sensing elements and the second neighboring sensing element are connected together to the respective second storage node during the second detection interval. The photocharge is outputted from the storage nodes.

The present invention will be more fully understood from the following detailed description of the embodiments thereof, taken together with the drawings in which:

BRIEF DESCRIPTION OF THE DRAWINGS

FIGS. 4a and 4b are schematic frontal views of an image sensor showing phases of detection of storage nodes in the image sensor in an iTOF depth sensing mode, in accordance with an embodiment of the invention;

FIG. 10 is a table showing a configuration of switches for coupling sensing elements to storage nodes.

DETAILED DESCRIPTION OF EMBODIMENTS

Overview

Figure 1:
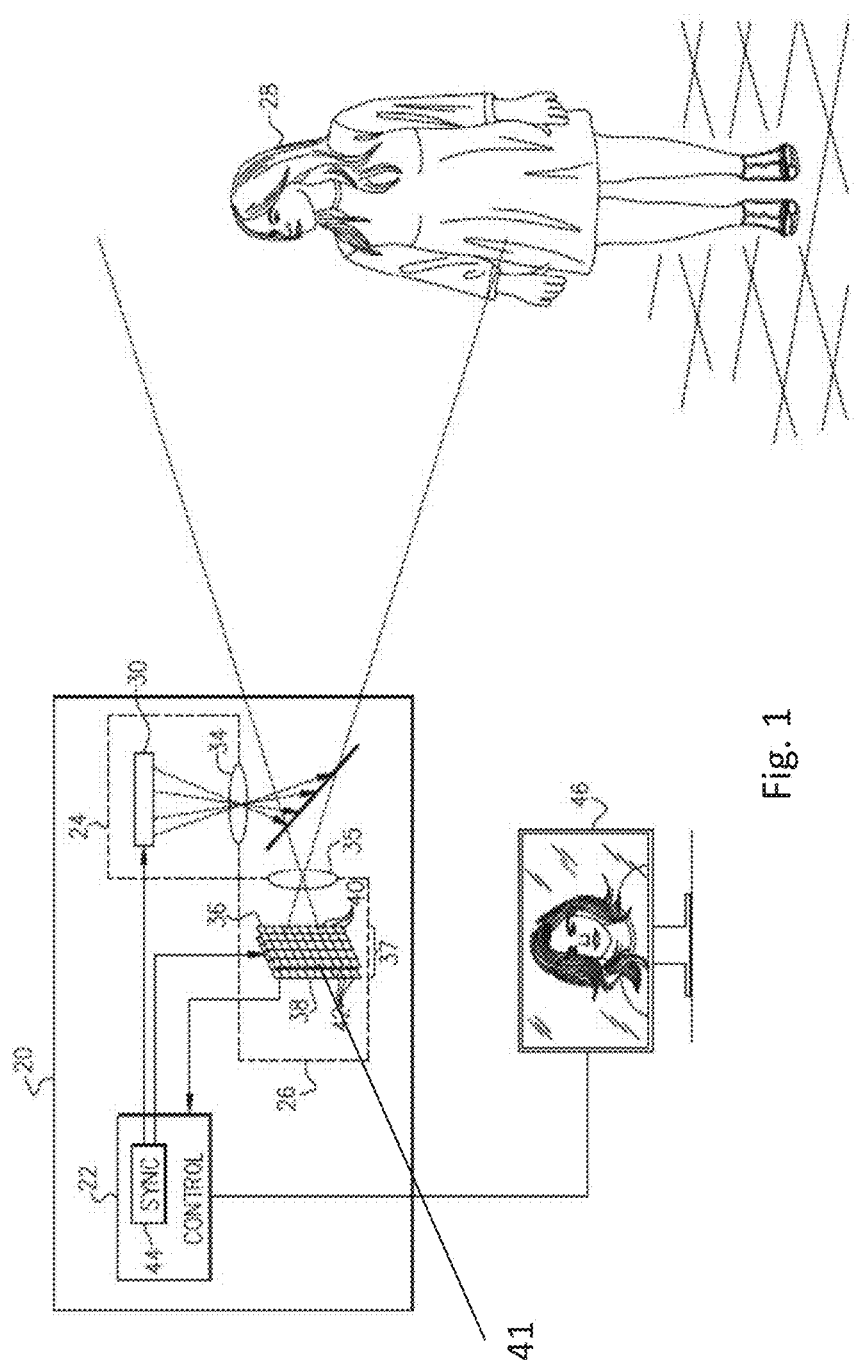
FIG. 1 is a block diagram that schematically illustrates a combined depth mapping and 2D imaging apparatus, in accordance with an embodiment of the invention.

Optical indirect TOF (iTOF) systems that are known in the art use multiple different acquisition phases in the receiver in order to measure the phase shift of the carrier wave in the light that is reflected from each point in the target scene. For this purpose, many iTOF systems use special-purpose image sensing arrays, in which each sensing element is gated individually to receive and integrate light during a respective phase of the cycle of the carrier wave. At least three different gating phases are needed in order to measure the phase shift of the carrier wave in the received light relative to the transmitted beam. For practical reasons, most systems acquire light during four distinct gating phases.

In a typical image sensing array of this sort, the optical sensing elements are arranged in groups of four sensing elements. Each optical sensing element in a given group integrates, in one or more respective storage nodes, photocharge that is generated due to light received over one or more different, respective detection intervals, which are synchronized at different phase angles relative to the carrier frequency, for example at 0°, 90°, 180° and 270°. A processing circuit combines the respective signals from the group of sensing elements in the four detection intervals (referred to as $I_0$, $I_{90}$, $I_{180}$ and $I_{270}$, respectively) to extract a depth value, which is proportional to the function $\tan^{-1}[(I_{270}-I_{90})/(I_0-I_{180})]$. The constant of proportionality and maximal depth range depend on the choice of carrier wave frequency. Alternatively, other combinations of phase angles may be used for this purpose, for example six phases that are sixty degrees apart (0°, 60°, 120°, 180°, 240° and 300°), with corresponding adjustment of the TOF computation.

Other iTOF systems use smaller groups of sensing elements, for example pairs of sensing elements that integrate photocharge in respective storage nodes due to received light in phases 180° apart, or even arrays of sensing elements that all share the same detection interval or intervals. In such cases, the synchronization of the detection intervals of the entire array of sensing elements is shifted relative to the carrier wave of the transmitted beam over successive image frames in order to acquire sufficient information to measure the phase shift of the carrier wave in the received light relative to the transmitted beam. The processing circuit then combines the pixel values over two or more successive image frames in order to compute the depth coordinate for each point in the scene.

In order to maximize the signal/noise ratio (SNR) of the iTOF image, it is desirable that each optical sensing element in the image sensing array have two storage nodes. Switching circuitry couples the photocharge from the sensing element to each of the storage nodes in turn during respective detection intervals in each carrier cycle. In this manner, for example, each sensing element will generate and store, in each carrier cycle, the $I_0$ intensity component in its first storage node and the $I_{180}$ intensity component in its second storage node (or the $I_{90}$ and $I_{270}$ components). This same image sensing array can also be used to capture 2D images, typically under flood illumination, in a 2D sensing mode, in which photocharge is stored in only one of the storage nodes (or in both storage nodes together, rather than in opposite phases). Alternatively, a 2D image can be obtained by summing signals from both storage nodes obtained during 3D mapping. The need to accommodate dual storage nodes and switching circuitry in each cell of the image sensor, however, increases the pitch of the sensing elements in the array, and therefore limits the spatial resolution of the 2D images, relative to images that can be captured by a conventional image sensor with only one storage node per cell.

Embodiments of the present invention that are described herein address this problem by providing an image sensing array with storage nodes that are shared between neighboring sensing elements. In iTOF mode, switching circuitry in each cell of the array transfers the photocharge to the two neighboring storage nodes during different, respective detection intervals in respective phases of each carrier cycle. The switching circuitry is operated so that each storage node receives and stores photocharge generated by the two neighboring sensing elements during the same detection interval. On the other hand, in 2D imaging mode, each sensing element is connected individually to a single, respective storage node. Because the array contains the same number of storage nodes as sensing elements, the pitch of the sensing elements—and hence the resolution of the 2D images—is comparable to that of conventional, high-resolution image sensors. At the same time, the novel mode of sharing of neighboring storage nodes enables the array to capture 3D iTOF data with SNR and resolution comparable to iTOF sensors having two storage nodes per cell.

The disclosed embodiments provide apparatus for optical sensing in which a matrix of optical sensing elements and a matrix of charge storage nodes are arranged on a semiconductor substrate such that each storage node is in proximity to two neighboring sensing elements. Thus, each sensing element within the matrix is in proximity to two neighboring storage nodes on different sides of the sensing element. In the embodiments that are described below and shown in the figures, the storage nodes are interleaved along the rows of the matrix of sensing elements. The term "interleaving" is used in this context to mean that any given sensing element within any given row of the matrix shares a first storage node with a first neighboring sensing element on one side of the given sensing element along the row, while sharing a second storage node with a second neighboring sensing element on the opposite side along the row (with the possible exception of the sensing elements at the ends of the row).

In alternative embodiments, however, the sensing elements and storage nodes may be arranged in different relations. For example, a given sensing element may share at least one of its two neighboring storage nodes with a neighboring sensing element in another row of the matrix (such as an adjacent sensing element along the same column of the matrix). Additionally or alternatively, the matrix of storage nodes may be positioned below the matrix of sensing elements, for example using chip-stacking techniques. All such alternative arrangements of sensing elements and neighboring storage nodes are considered to be within the scope of the present invention, regardless of the specific topology that is used.

Switching circuitry connects each sensing element to transfer photocharge to the two neighboring storage nodes, such that the sensing element shares these storage nodes with its two neighboring sensing elements. When operating the array in iTOF depth sensing mode, control circuitry controls the switching circuitry to switch between the neighboring storage nodes during respective detection intervals over a series of detection cycles (which are typically synchronized with the carrier frequency of illumination of the target scene). In a first detection interval in each cycle, each sensing element is connected together with one of its two neighboring sensing elements to one of the neighboring storage nodes. Then, in the second detection interval in the cycle, each sensing element is connected together with its other neighboring sensing element to the other neighboring storage node. Readout circuitry outputs the photocharge from the storage nodes in the array.

As noted earlier and will be further described hereinbelow, the present apparatus can be used for both depth mapping and for high-resolution 2D imaging, by appropriate control of the switching circuitry. The switching circuitry may also comprise shutter gates coupled to apply a global shutter to the sensing elements in the 2D sensing mode. In some embodiments, the apparatus further comprises an illumination assembly directing optical radiation toward a target scene, and objective optics, which form an image of the target scene onto the matrix of the optical sensing elements. Alternatively, however, the novel switching and control circuitry in the sensing array may be used in other modes of operation, with or without a dedicated illumination assembly.

In the disclosed embodiments, the apparatus performs depth mapping using the method of iTOF. The illumination assembly modulates the optical radiation directed toward the target scene with a carrier wave having a predetermined carrier frequency. Each sensing element samples, under the control of the control circuitry, the image of the target scene in two discrete detection intervals during each cycle of the carrier wave. Numbering the storage nodes in each row (for the sake of convenience) as "even" and "odd", the control circuitry controls the switches associated with each sensing element in synchronization with the carrier wave in such a manner that, during the first detection interval, the photocharge generated by their adjacent sensing elements is transferred to the even storage nodes, and, during the second detection interval, the photocharge generated by their adjacent sensing elements is transferred to the odd storage nodes.

For example, using the above-described scheme of four detection intervals, during a first cycle (or sequence of cycles) of the carrier wave, the even storage nodes in a row accumulate photocharge from the detection interval at 0° phase relative to the carrier wave, and the odd storage nodes accumulate photocharge from the detection interval at 180°. During the next cycle (or sequence of cycles), the storage nodes accumulate photocharge from the respective detection intervals at 90° and 270°. Alternatively, the alternating storage nodes in even-numbered rows of the matrix may accumulate photocharge in detection intervals at 0° and 180°, while those in the odd-numbered rows accumulate photocharge in detection intervals at 90° and 270°.

Following each series of detection cycles, the photocharges are output from the storage nodes by the readout circuitry. Since the photocharges from two neighboring sensing elements are accumulated in the same storage node, each pixel will comprise these two sensing elements. (The term "pixels" is used in the present description and in the claims to refer to the image data that are read out from the storage nodes, in response to the accumulated charge.) Thus, for a matrix of sensing elements with N columns and M rows, the spatial resolution of the depth map in pixels will be (N/2)×M, or (N/2)×(M/2) if alternating rows are used to acquire alternating detection phases, as noted above.

In the 2D sensing mode, according to the disclosed embodiments, the switches connect each sensing element to a single, respective storage node. For example, each sensing element may be connected to a storage node shared to the left of the sensing element. Thus, for the above N×M matrix, the spatial resolution in pixels will be the full N×M resolution of the matrix. Due to the sharing of storage nodes between sensing elements, the pitch of the sensing elements can be as small as 2 µm using current fabrication technology. This fine pitch enables high-resolution 2D imaging, while simultaneously providing a sensor for iTOF.

System Description

FIG. 1 is a block diagram that schematically illustrates a combined depth mapping and 2D imaging apparatus 20, in accordance with an embodiment of the invention. Apparatus 20 comprises an illumination assembly 24 and a detection assembly 26, under control of control circuitry 22. In the pictured embodiment, the illumination and detection assemblies are boresighted, and thus share the same optical axis outside apparatus 20, without parallax; but alternatively, other optical configurations may be used.

Illumination assembly 24 comprises a beam source 30, for example a suitable semiconductor emitter, such as a semiconductor laser or high-intensity light-emitting diode (LED), or an array of such emitters, which emits optical radiation toward a target scene 28 (in this case containing a human subject). Typically, beam source 30 emits infrared radiation, but alternatively, radiation in other parts of the optical spectrum may be used. The radiation may be collimated by projection optics 34.

For depth mapping, a synchronization circuit 44 in control circuitry 22 modulates the amplitude of the radiation that is output by source 30 with a carrier wave having a specified carrier frequency. For example, the carrier frequency may be 100 MHz, meaning that the carrier wavelength (when applied to the radiation output by beam source 30) is about 3 m, which also determines the effective range of apparatus 20. (Beyond this effective range, i.e., 1.5 m in the present example, depth measurements may be ambiguous due to range folding.) Alternatively, higher or lower carrier frequencies may be used, depending, inter alia, on considerations of the required range, precision, and signal/noise ratio.

Figure 9:
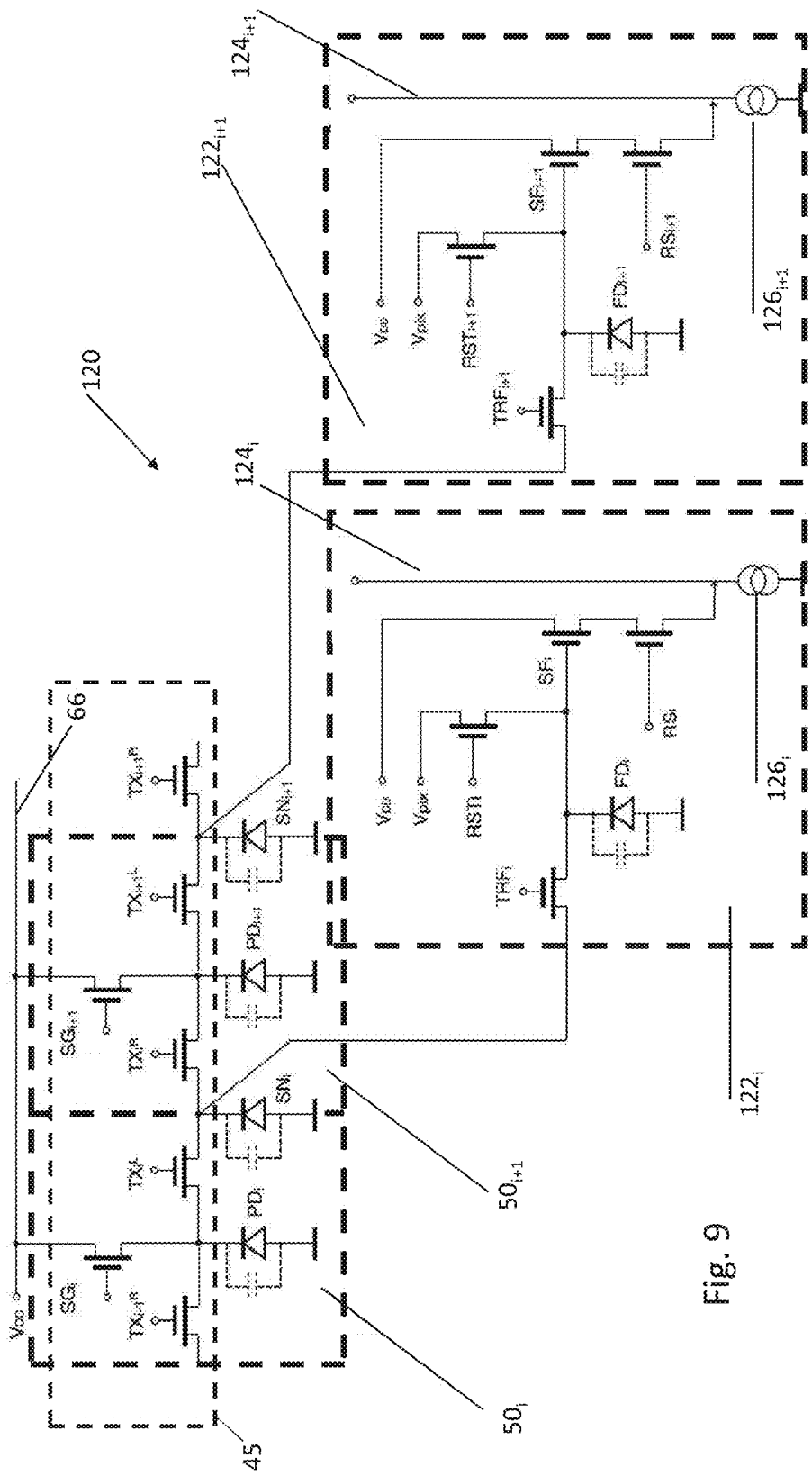
FIG. 9 is a schematic circuit diagram showing details of sensing elements and associated circuitry in an image sensor, in accordance with an embodiment of the invention.

Detection assembly 26 receives the optical radiation that is reflected from target scene 28 via objective optics 35. The objective optics form an image of the target scene on a matrix 36 of optical sensing elements 40, comprising photodiodes or phototransistors, for example, in an iTOF image sensor 37. Sensing elements 40, formed on a semiconductor substrate 41, such as a silicon chip, are connected to a corresponding matrix 38 of charge storage and readout circuits 42 on the semiconductor substrate. Circuits 42 comprise storage nodes and switching circuitry, as shown in the figures that follow, which gates the detection intervals during which the sensing elements integrate the optical radiation that is focused onto matrix 36. Circuits 42 also comprise switches for reading the charge out of the storage nodes onto the column lines of image sensor 37 (as shown in FIG. 9).

Typically, although not necessarily, image sensor 37 comprises a single integrated circuit device, in which sensing elements 40 and circuits 42 are integrated. Alternatively, sensing elements 40 may be connected to circuits 42 using other technologies, such as chip stacking, for example, and may comprise either silicon or other materials, such as III-V semiconductor materials.

Synchronization circuit 44 controls charge storage and readout circuits 42 so that the photocharge generated by sensing elements 40 in response to the optical radiation that is incident on image sensor 37 is stored in different storage nodes during different detection intervals, which are synchronized with the carrier frequency that is applied to beam source 30. For example, circuits 42 comprise charge storage nodes and switches that are controlled to select different storage nodes during different detection intervals, which are synchronized with the carrier frequency at different, respective temporal phase angles, as illustrated further in the figures that follow.

Objective optics 35 form an image of target scene 28 on matrix 36 such that each point in the target scene is imaged onto a corresponding sensing element 40. To compute the depth coordinates of each point, control circuitry 22 combines the signals output by the sensing elements, as gated by circuits 42, as described further hereinbelow. Control circuitry 22 may then output a depth map 46 made up of these depth coordinates, and possibly a two-dimensional image of the scene, as well.

For 2D imaging, the amplitude of the optical radiation emitted by beam source 30 toward a target scene 28 may be either modulated by synchronization circuit 44 or emitted as unmodulated radiation. As will be detailed further hereinbelow, for 2D imaging sensing, circuits 42 are not required to be synchronized with the emitted radiation, but are rather configured to collect a sufficient amount of radiation for generating a 2D image. In this case, synchronization circuit 44 may drive charge storage and readout circuits 42 to apply a global shutter so as to control the exposure level of the entire image sensor.

Control circuitry 22 typically comprises a general or special-purpose microprocessor or digital signal processor, which is programmed in software or firmware to carry out the functions that are described herein. The control circuitry also includes suitable digital and analog peripheral circuits and interfaces, including synchronization circuit 44, for outputting control signals to and receiving inputs from the other elements of apparatus 20. The detailed design of such circuits will be apparent to those skilled in the art of depth mapping devices after reading the present description.

Sensor Design and Operation

Figure 2:
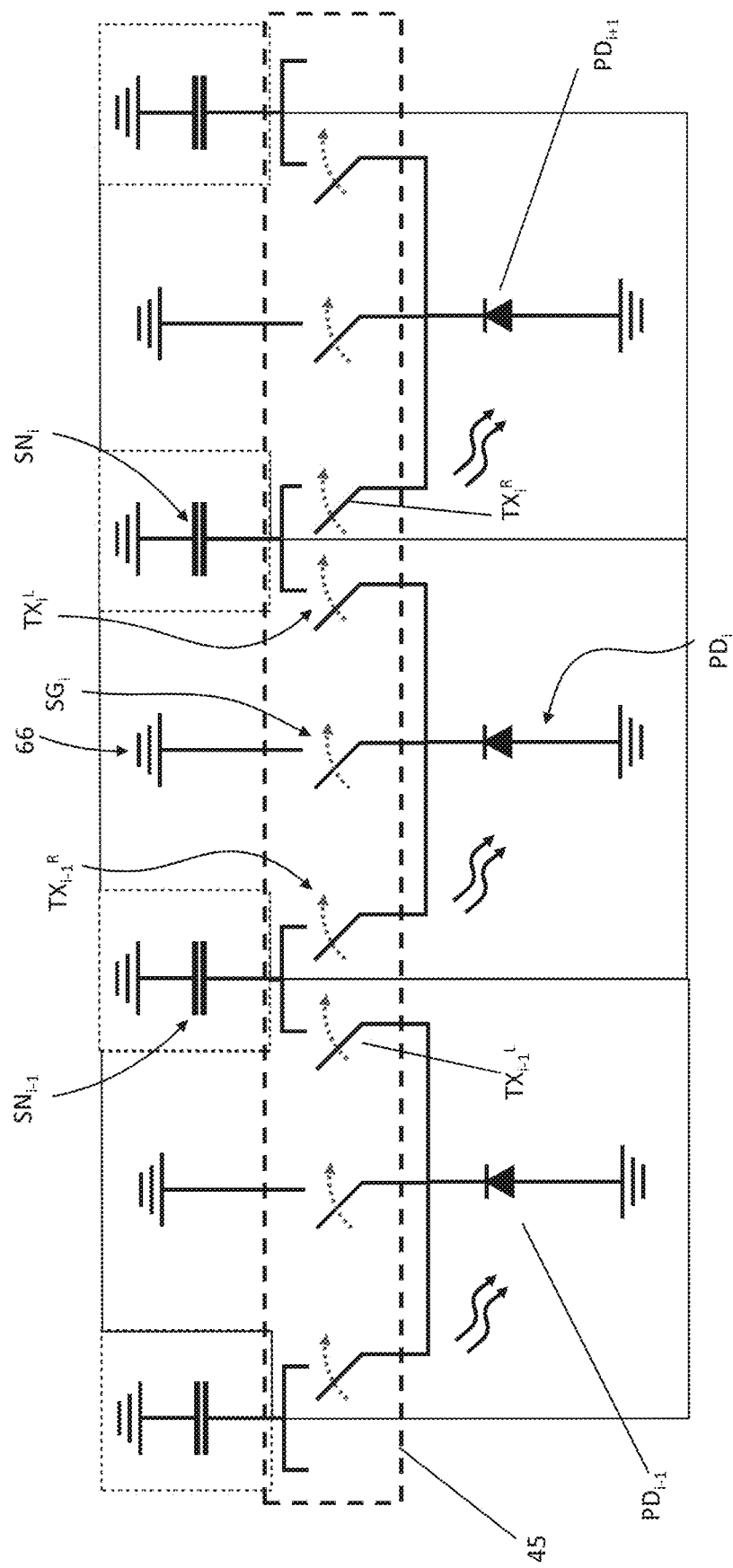
FIG. 2 is a schematic circuit diagram of an array of optical sensing elements and associated circuitry, in accordance with an embodiment of the invention.

FIG. 2 is a schematic circuit diagram showing an array of optical sensing elements and associated circuitry, in accordance with an embodiment of the invention. The sensing elements in this embodiment are assumed to be photodiodes, and are accordingly labeled PD. In this and subsequent figures, for the sake of clarity of illustration the sensing elements are shown as being interleaved with storage nodes along the rows of the array; but other topological arrangements may alternatively be used, as noted above.

FIG. 2 shows three adjacent sensing elements $PD_{i-1}$, $PD_i$, and $PD_{i+1}$ in a row of matrix 36. Each sensing element is coupled to a pair of neighboring storage nodes SN by respective transfer switches TX. Each sensing element is also connected to a common drain 66 by a switch referred to as a shutter gate SG. For the sake of simplicity, readout circuitry for reading charges out of storage nodes SN is omitted here, but is shown in FIG. 9, below. All of switches TX and SG together form switching circuitry 45, which controlled by control circuitry 22.

The matrix of storage nodes SN is interleaved with the sensing elements PD along the rows of matrix 36, so that each sensing element PD within any given row is in proximity to two neighboring storage nodes SN on its opposing sides along the row. (The term "within any given row" may exclude the sensing elements at the ends of the row, depending on the detailed structure of the image sensor.) Each neighboring pair of sensing elements PD thus shares a storage node SN between them. For example, sensing element $PD_i$ shares with sensing element $PD_{i-1}$ a charge storage node $SN_{i-1}$, and with sensing element $PD_{i+1}$ a charge storage node $SN_i$. (The terms "charge storage node" and "storage node" are used interchangeably.)

Each sensing element $PD_{i-1}$, $PD_i$, and $PD_{i+1}$ is connected to two switches $TX_X^Y$ for connecting each sensing element independently to two each of its neighboring storage nodes SN. In the notation $TX_X^Y$, index X refers to the storage node SN to which the switch connects, and Y is either L or R, corresponding to whether the switch is to the left or the right of the storage node, with "left" and "right" chosen for convenience within the view of FIG. 2. For example, switch $TX_{i-1}^R$ connects sensing element $PD_i$ to storage node $SN_{i-1}$, whereas switch $TX_i^L$ connects the same sensing element to storage node $SN_i$.

As a further example, the configuration of switches $TX_X^Y$ for coupling sensing elements $PD_{i-1}$, $PD_i$, and $PD_{i+1}$ to storage nodes $SN_{i-1}$ and $SN_i$ is shown in FIG. 10.

Additional switches couple sensing elements PDi-1 and PDi+1 to storage nodes shared with sensing elements outside FIG. 2, but for the sake of simplicity, these switches are not labelled in this figure.

As noted above, each sensing element PD is also connected by a respective shutter gate SG to common drain 66, for draining any remaining photocharge from the sensing element prior to acquiring a new image. For the sake of simplicity, only shutter gate $SG_i$ (for sensing element $PD_i$) and common drain 66 are labelled in FIG. 2.

Figure 3A:
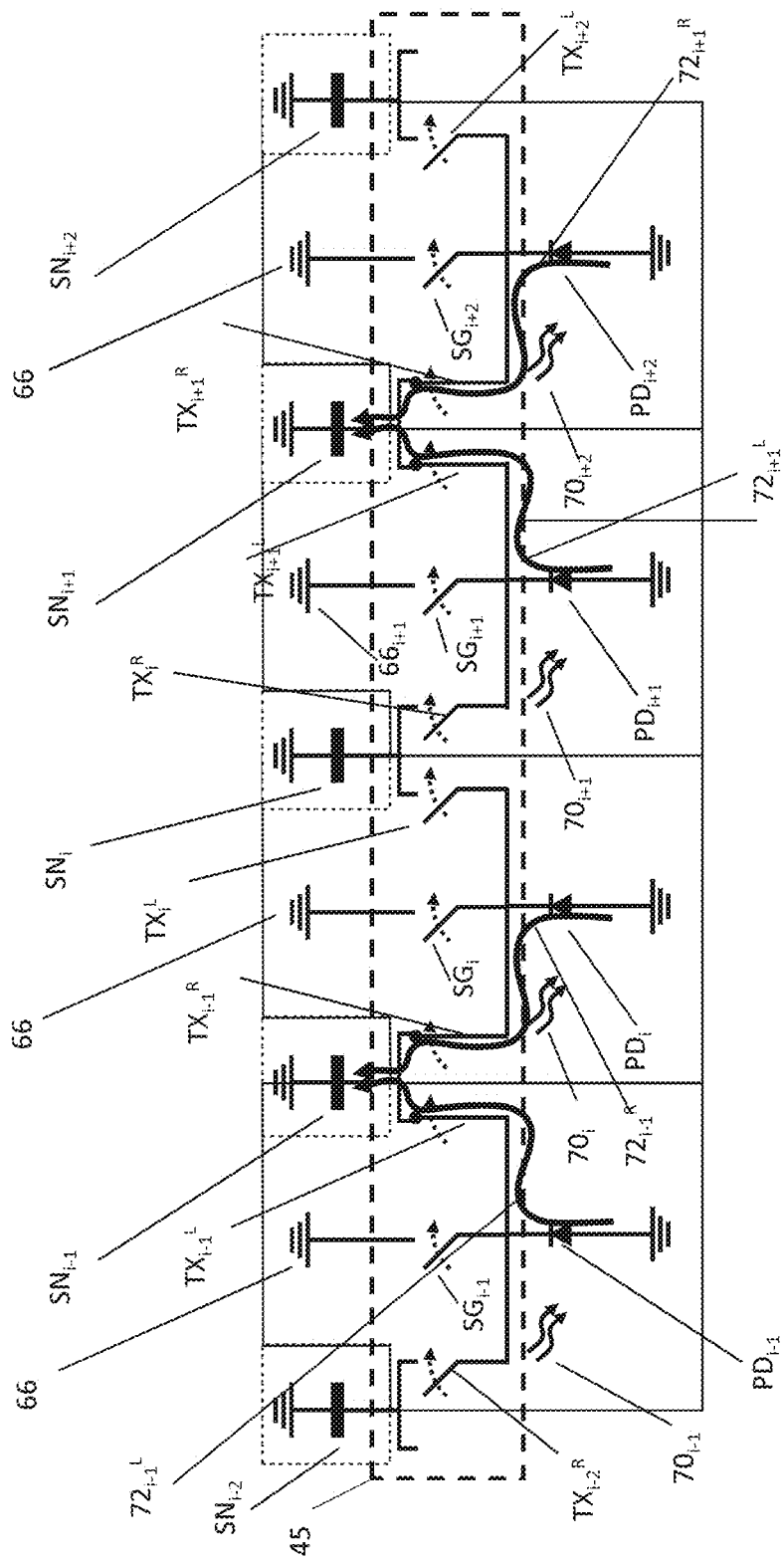
FIGS. 3a and 3b are schematic circuit diagrams of an array of optical sensing elements, showing the operation of switching circuitry in the array in an iTOF depth sensing mode, in accordance with an embodiment of the invention.
Figure 3B:
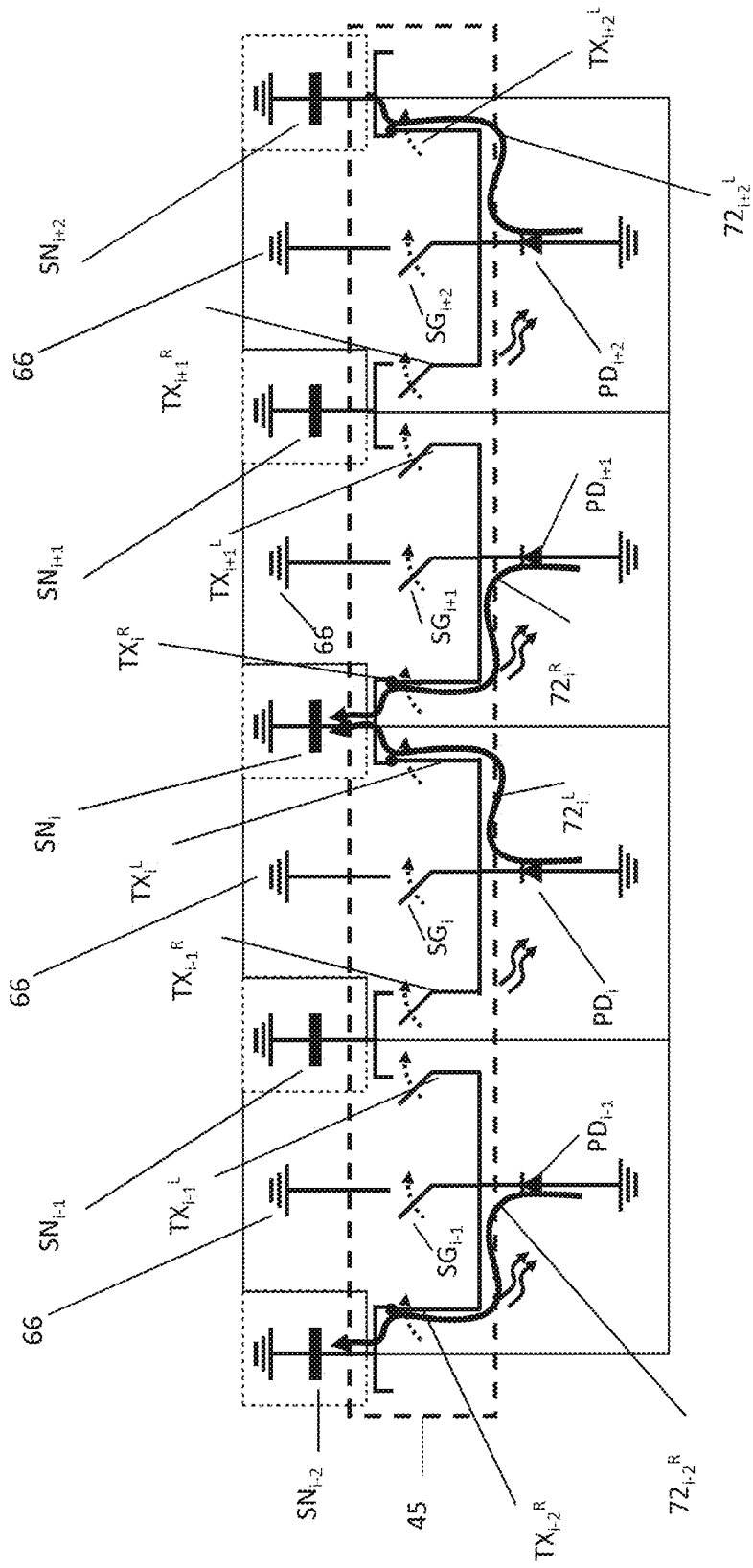

FIGS. 3a and 3b are schematic circuit diagrams showing the operation of switching circuitry 45 in an iTOF depth sensing mode, in accordance with an embodiment of the invention. The figures show the settings of switches TX in two different detection intervals, synchronized to respective phase angles of 0° and 180° of the carrier frequency applied to illumination assembly 24.

Each of FIGS. 3a and 3b shows four sensing elements PD of matrix 36, labelled $PD_{i-1}$, $PD_i$, $PD_{i+1}$, and $PD_{i+2}$. All sensing elements PD, switches TX, and drain switches SG are labelled using the same numbering scheme as in FIG. 2. Optical radiation impinging on sensing elements $PD_{i-1}$, $PD_i$, $PD_{i+1}$, and $PD_{i+2}$ is indicated by double wavy arrows $70_{i-1}$, $70_i$, $70_{i+1}$, and $70_{i+2}$, respectively.

Before each exposure, all shutter gates SG are closed so as to drain from sensing elements PD into common drain any remaining charge from previous exposures. The shutter gates are then opened before the exposure, as shown in the figures.

At the detection interval synchronized to phase angle of 0° (FIG. 3a), control circuitry 22 closes switches $TX_{i-1}^L$, $TX_{i+1}^R$, $TX_{i+1}^L$, and $TX_{i+1}^R$ (with the other switches left open). Closing these switches transfers the photocharges generated by sensing elements $PD_{i-1}$ and $PD_i$ to storage node $SN_{i-1}$, as shown by arrows $72_{i-1}^L$ and $72_{i-1}^R$, and the photocharges generated by sensing elements $PD_{i+1}$ and $PD_{i+2}$ to storage node $SN_{i+1}$, as shown by arrows $72_{i+1}^L$ and $72_{i+1}^R$. Consequently, sensing elements $PD_{i-1}$ and $PD_i$ together define one pixel during this detection interval, and sensing elements $PD_{i+1}$ and $PD_{i+2}$ define a neighboring pixel.

At the detection interval synchronized to phase angle of 180° (FIG. 3b), control circuitry 22 closes switches $TX_{i-2}^R$, $TX_i^L$, $TX_i^R$, and $TX_{i+2}^L$ (with the other switches left open). Closing these switches transfers the photocharges generated by sensing elements $PD_i$ and $PD_{i+1}$ to storage node $SN_i$, as shown by arrows $72_i^L$ and $72_i^R$. The photocharges from sensing elements $PD_{i-1}$ and $PD_{i+2}$ are transferred to respective storage nodes $SN_{i-2}$ and $SN_{i+2}$, as shown by arrows $72_{i-2}^R$ and $72_{i+2}^L$, along with the photocharges from sensing elements $PD_{i-2}$ and $PD_{i+3}$ (not shown in FIG. 3b). The only full pixel (pixel receiving photocharge from two sensing elements) shown in FIG. 3b is defined by sensing elements $PD_i$ and $PD_{i+1}$, whereas sensing elements $PD_{i-1}$ and $PD_{i+2}$ each define pixels with, respectively, sensing elements $PD_{i-2}$ and $PD_{i+3}$.

Control circuitry 22 controls switching circuitry 45 in this manner to alternate between the configurations of FIGS. 3a and 3b over a series of detection cycles. Thus, each of the sensing elements PD and one of its neighboring sensing elements (to its left or right) are connected together to one of the neighboring storage nodes SN during the detection interval illustrated in FIG. 3a; and each of the sensing elements and its other neighboring sensing element are connected together to the other neighboring storage node during the detection interval illustrated in FIG. 3b. After having stored the photocharges for the detection intervals at 0° and 180° to the respective storage nodes, typically (although not necessarily) over multiple cycles, the readout circuitry reads the photocharges out as signals $I_0$ and $I_{180}$.

Comparing FIGS. 3a and 3b, it is seen that the pixels acquired in the detection interval at 180° are shifted by one sensing element PD from the pixels acquired at 0° in each row.

In some embodiments, the photocharges in the detection intervals at 90° and 270° are collected in each row in similar fashion over a subsequent series of detection cycles, with appropriate adjustment of the phases of switching circuitry 45. Alternatively, the alternating rows of matrix 36 may be driven 90° out of phase, so that one row collects the photocharges in the detection intervals at 0° and 180°, while the next row collects the photocharges in the detection intervals at 90° and 270°. In either case, referring to FIGS. 3a-3b, the photocharges collected at 90° are stored, similarly to those collected at 0°, in storage nodes $SN_{i-1}$ and $SN_{i+1}$, and the photocharges collected at 270° are stored, similarly to those collected at 180°, in storage nodes $SN_{i-2}$, $SN_i$, and $SN_{i+2}$.

After having stored the respective photocharges for the detection intervals at 90° and 270°, the readout circuitry reads the photocharges out as signals $I_{90}$ and $I_{270}$. These signals, together with the signals $I_0$ and $I_{180}$ are used by control circuitry 22 to calculate a depth value for each pixel, which is proportional to the function $\tan^{-1}[(I_{270}-I_{90})/(I_0-I_{180})]$ for that pixel.

Figure 4B:
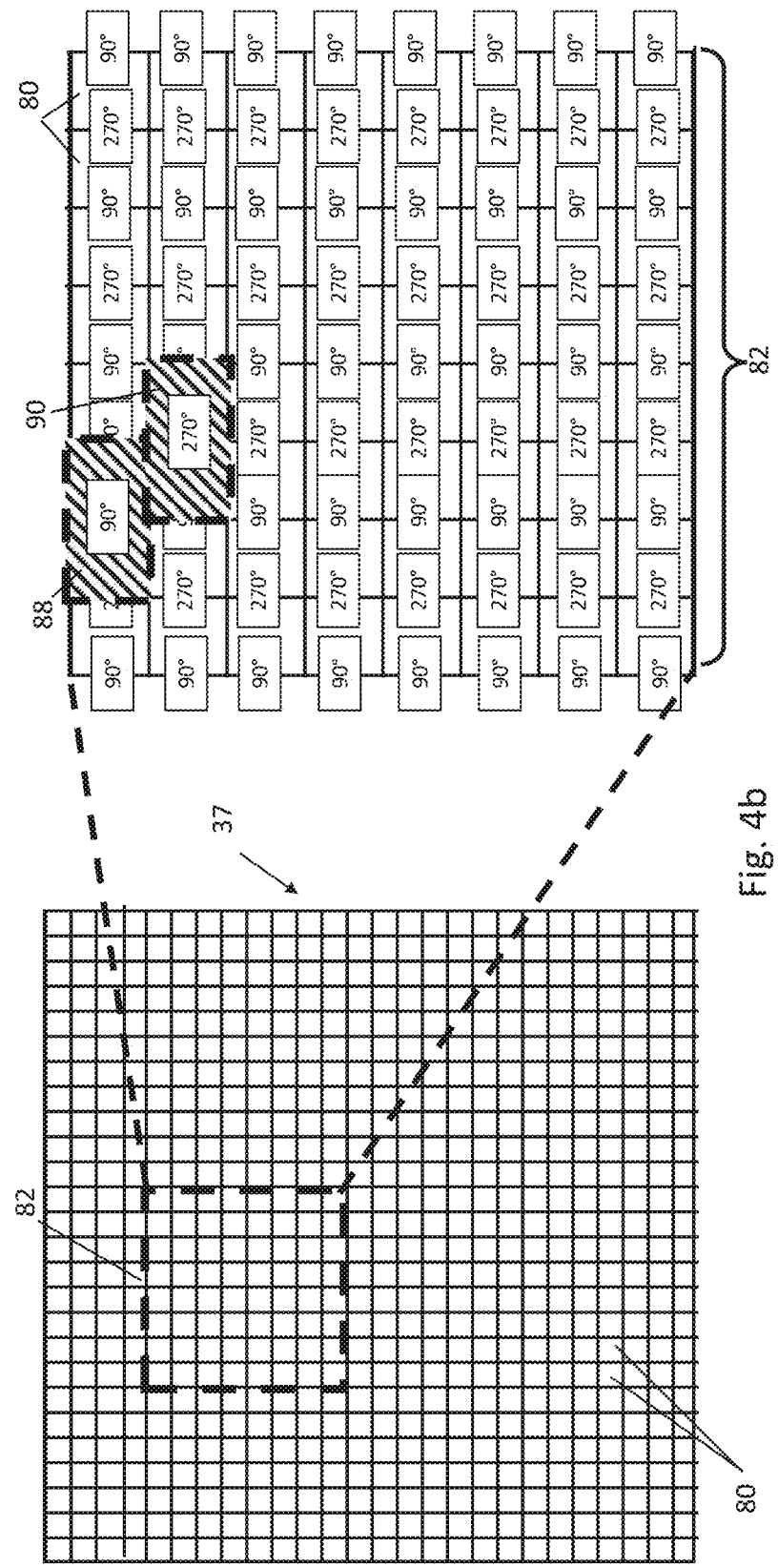

FIGS. 4a and 4b are schematic frontal views of image sensor 37 showing phases of detection of the storage nodes in iTOF depth sensing mode, in accordance with an embodiment of the invention. Image sensor 37 is represented schematically as a matrix of cells 80, each of which comprises a respective sensing element PD, with connections to the neighboring storage nodes as illustrated in the preceding figures. Although the pictured matrix comprises only several hundred sensing elements, in practice the matrix is typically much larger, for example 1000×1000 sensing elements. The insets in FIGS. 4a and 4b show an enlarged view of an 8×8 group 82 of cells 80.

FIG. 4a illustrates the spatial distribution of pixels 84 and 86 associated respectively with the two signal values $I_0$ and $I_{180}$. As shown in FIG. 3a, above, each of these signals is produced in a pixel comprising two adjacent sensing elements PD in response to the generated photocharges, with a one-element overlap between adjacent pixels at 0° and 180°. Thus, pixel 84 produces signal $I_0$, and pixel 86 produces signal $I_{180}$. In order to show the overlap conveniently, pixels 84 and 86 are drawn in successive rows.

Similarly, FIG. 4b illustrates the spatial distribution of pixels 88 and 90 producing the two signal values $I_{90}$ and $I_{270}$.

The sampling scheme demonstrated in FIGS. 4a and 4b shows that the pixels have a width of two cells 80 and a height of one cell. Thus, for an image sensor 37 with N columns and M rows of sensing elements 40, the spatial resolution in pixels will be (N/2)×M. After collecting the photocharges at 0° and 180° (FIG. 4a), storage nodes SN need to be read out before collecting the photocharges at 90° and 270° (FIG. 4b). Thus, the photocharges at all four phases (0°, 90°, 180°, and 270°) are collected over (at least) two image frames. Alternatively, if the alternating rows of matrix 36 are driven 90° out of phase, a complete iTOF image, including all four phases, can be collected in a single image frame, with spatial resolution of (N/2)×(M/2) pixels.

Figure 5:
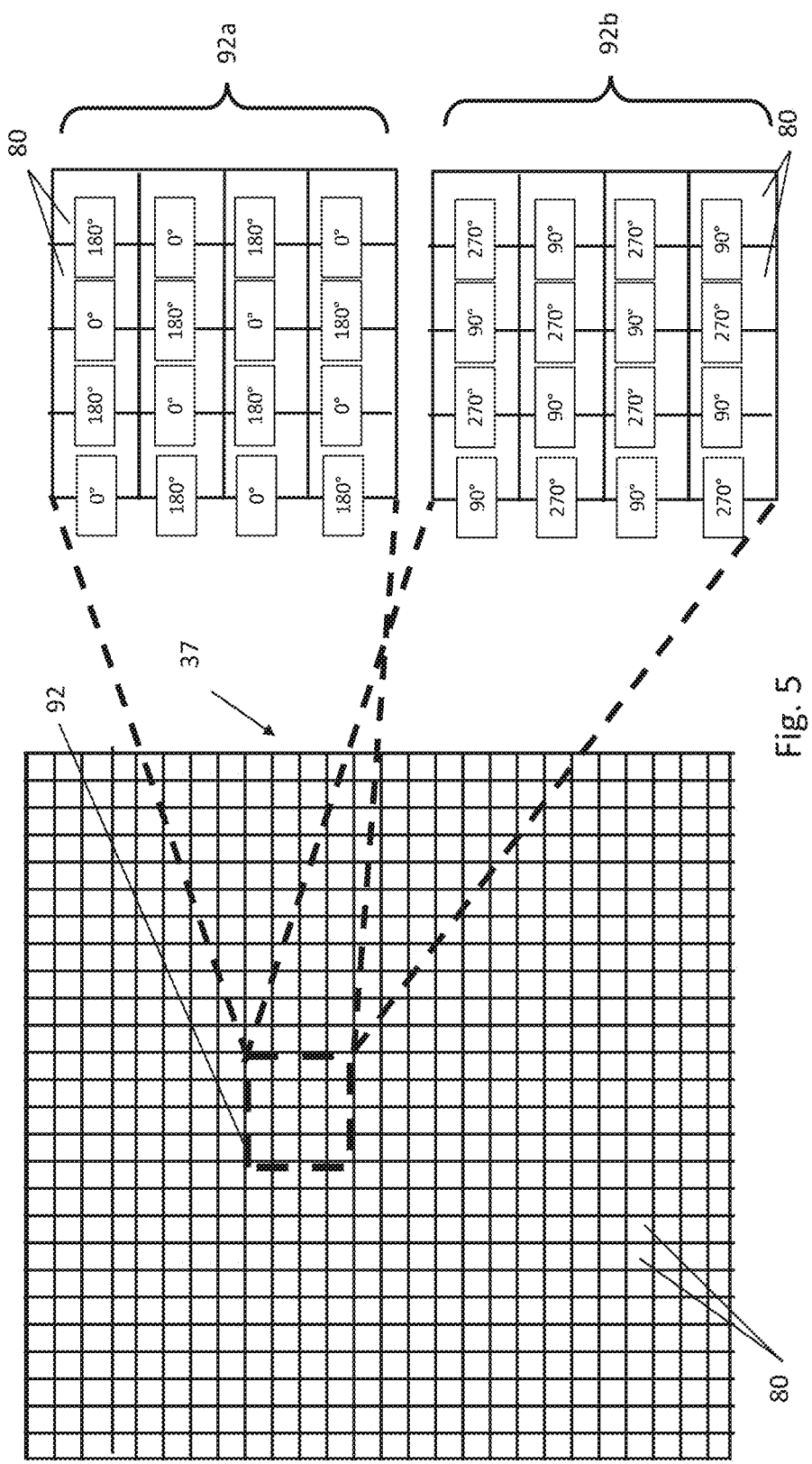
FIG. 5 is a schematic frontal view of an image sensor showing phases of detection of storage nodes in the image sensor in an iTOF depth sensing mode, in accordance with another embodiment of the invention.

FIG. 5 is a schematic frontal view of image sensor 37 in an iTOF depth sensing mode, in accordance with another embodiment of the invention. Insets 90a and 90b show two enlarged views of a 4×4 group 92 of cells 80. Similarly to FIGS. 4a and 4b, the pixels producing the signal values $I_0$ and $I_{180}$ are shown in inset 92a, and the pixels producing the signal values $I_{90}$ and $I_{270}$ are shown in inset 92b. The layout of the pixels differs from those in FIGS. 4a and 4b in that the polarity, i.e., the horizontal order, of the phases of the detection intervals of the pixels is reversed from row to row. Control circuitry 22 can implement the polarization reversal by varying the control signals applied to switching circuitry 45 in successive rows. Such polarization reversal may be utilized beneficially to reduce artifacts in the resulting depth map.

Figure 6:
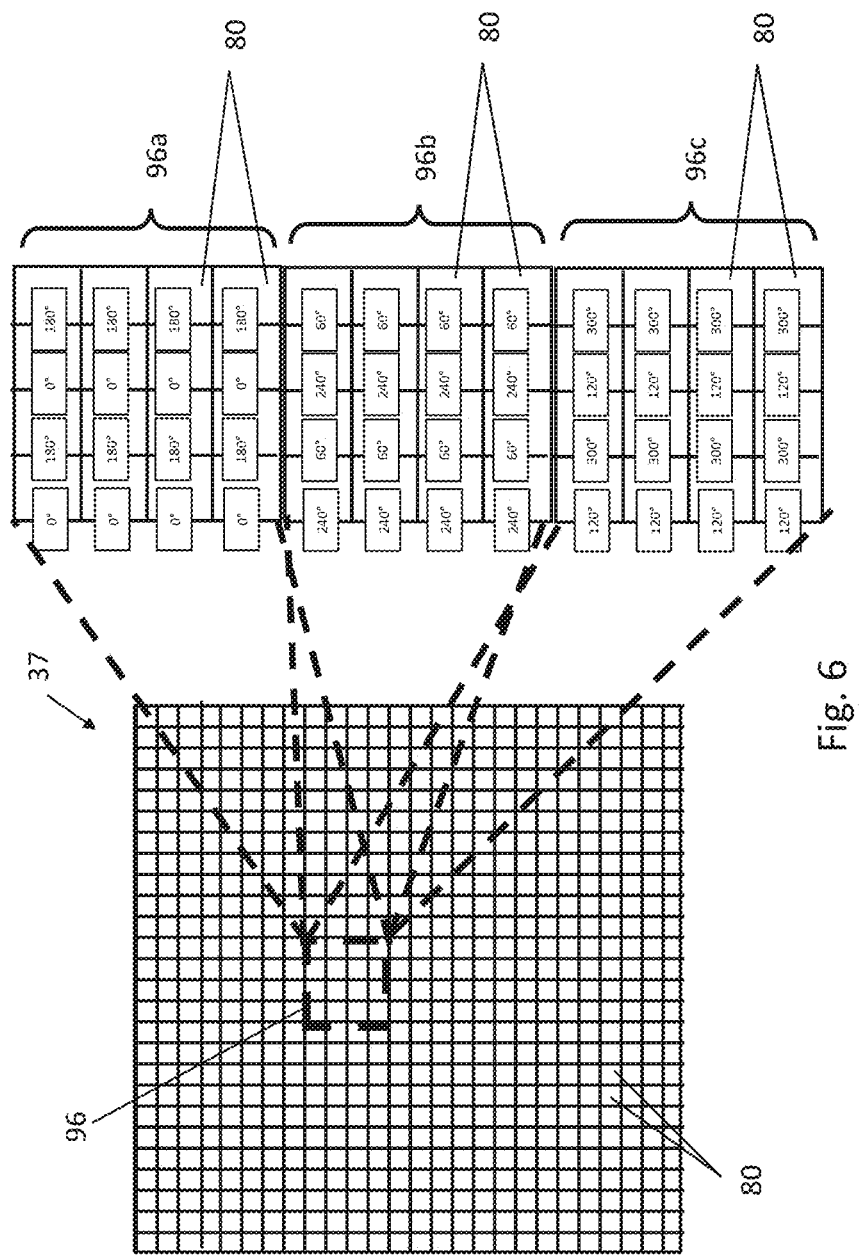
FIG. 6 is a schematic frontal view of an image sensor showing phases of detection of storage nodes in the image sensor in an iTOF depth sensing mode, in accordance with yet another embodiment of the invention.

FIG. 6 is a schematic frontal view of image sensor 37 in an iTOF depth sensing mode, in accordance with yet another embodiment of the invention. As in FIGS. 4a-4b and FIG. 5, image sensor 37 is represented schematically as a matrix of cells 80. Insets 96a, 96b, and 96c show three enlarged views of a 4×4 group 96 of cells 80. In this embodiment, the carrier wave is sampled at six detection intervals at 0°, 60°, 120°, 180°, and 240° in three pairs, 0°/180°, 60°/240°, and 120°/300°, with the two members of each pair always 180° degrees apart. The carrier wave is first sampled at 0° and 180, as shown in inset 96a. After the stored photocharges are read out from respective storage nodes SN, the carrier wave is sampled at 60° and 240°, as shown in inset 96b, followed again by readout of charges. Finally, the carrier wave is sampled at 120° and 300°, followed by readout of charges.

Thus, for reading out all the photocharges for all six detection intervals, three image frames are required. Although a full cycle of data acquisition is thus longer than, for example, a four-interval scheme, the additional data may improve the robustness of the depth mapping, while providing the same (N/2)×M spatial resolution.

Figure 7:
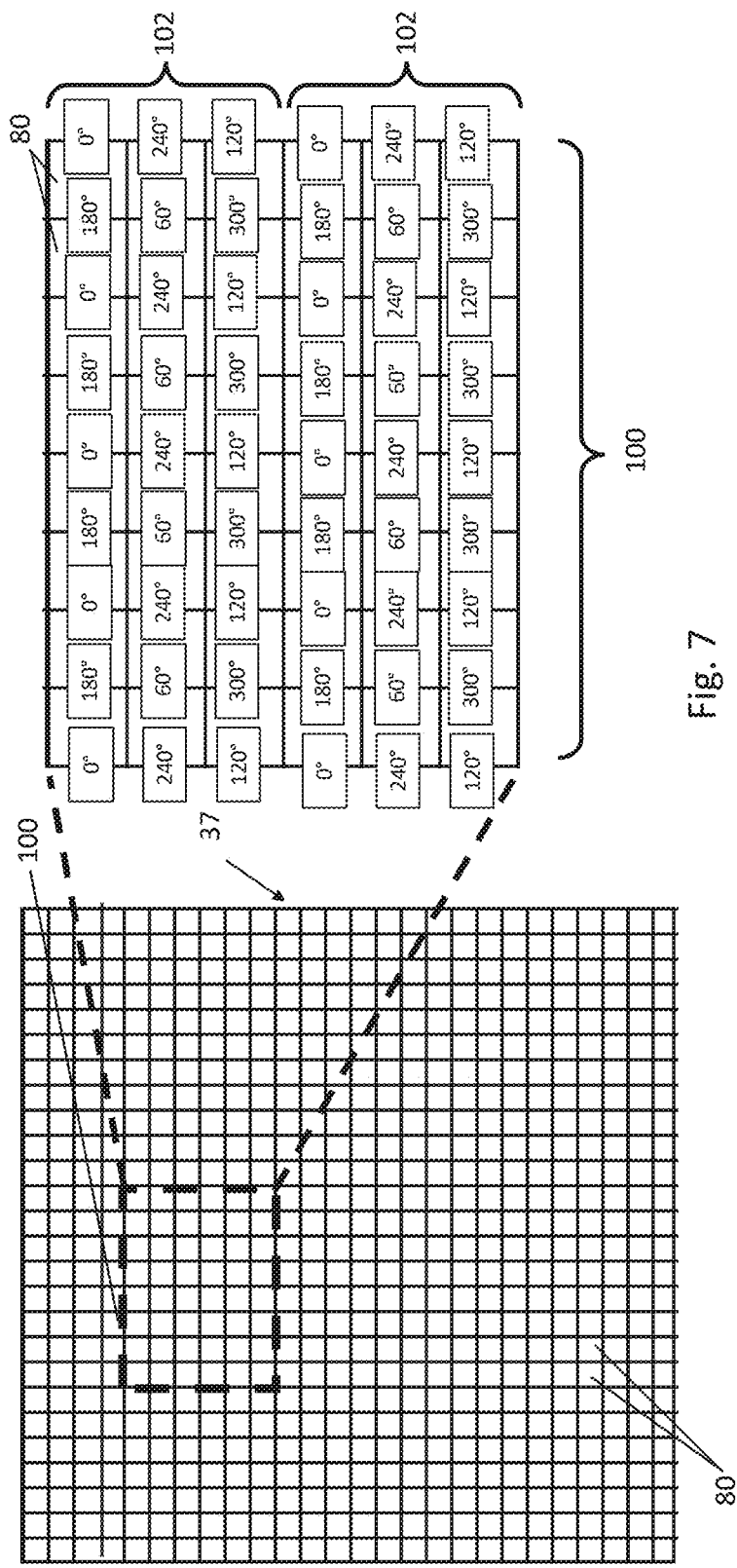
FIG. 7 is a schematic frontal view of an image sensor showing phases of detection of storage nodes in the image sensor in an iTOF depth sensing mode, in accordance with still another embodiment of the invention.

FIG. 7 is a schematic frontal view of image sensor 37 in an iTOF depth sensing mode, in accordance with still another embodiment of the invention. The inset in FIG. 7 shows an enlarged view of a group 100 of 6×8 cells 80. In this embodiment, the carrier wave is sampled at six detection intervals at 0°, 60°, 120°, 180°, and 240°, as in FIG. 6. In this case, all detection intervals are sampled during a single image frame by a suitable timing of switching circuitry 45 in each set 102 of three rows, thus enabling a three-fold increase in the sampling speed as compared to FIG. 6. However, due to the use of three rows for different detection intervals, the spatial resolution in pixels will be (N/2)×(M/3).

In all of FIGS. 4a-4b, 5, 6, and 7, image sensor 37 may be physically substantially the same sensor, with both the temporal and spatial sampling schemes controlled by control circuitry 22. In alternative embodiments, a polarization reversal of alternating rows similar to that shown in FIG. 5 may be implemented in the schemes shown in FIGS. 6 and 7, as well. Alternatively, switching circuitry 45 may be configured and controlled to enable spatial and temporal sampling schemes, as long as at least three detection intervals are sampled relative to the cycles of the carrier wave.

Figure 8:
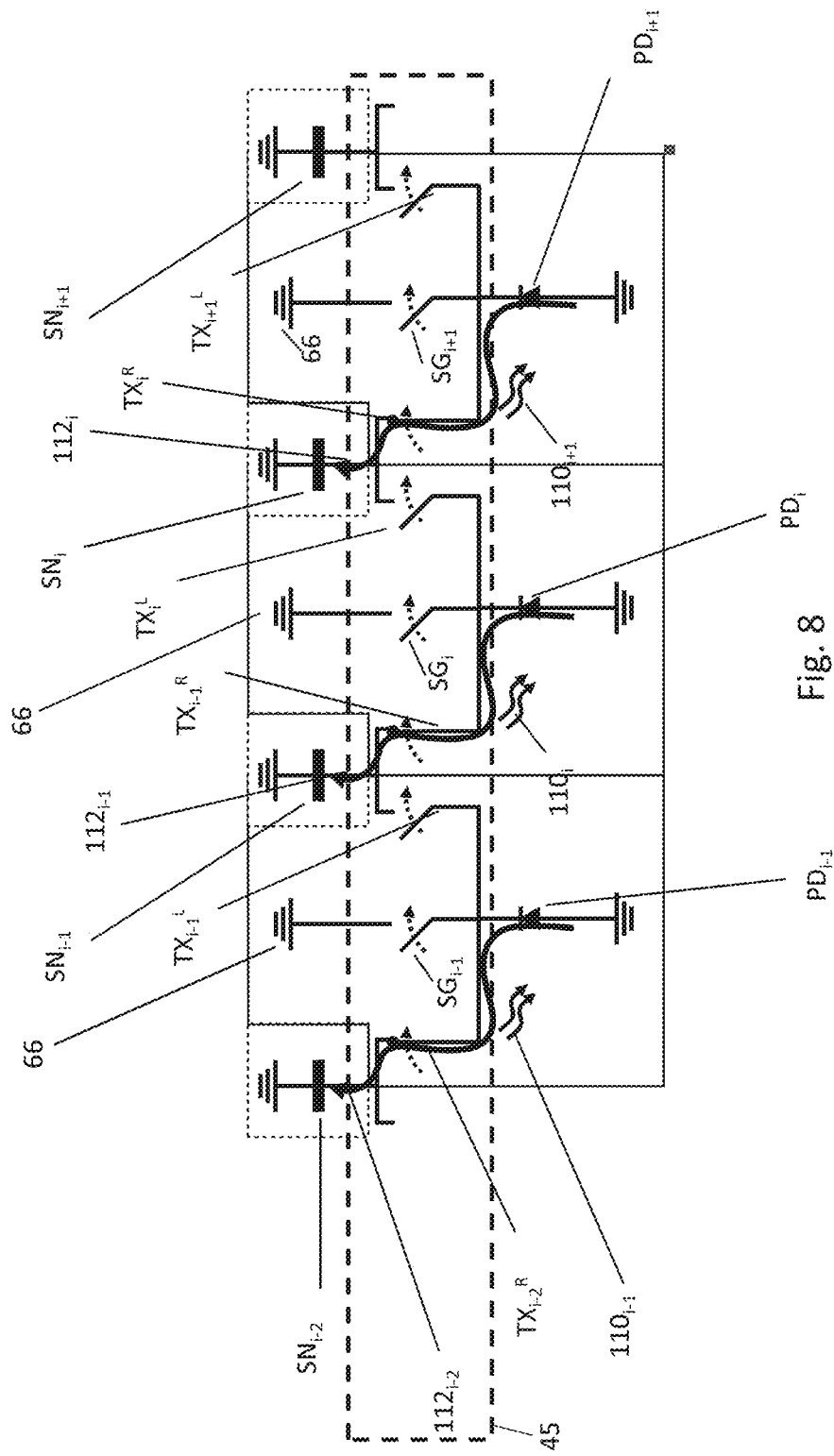
FIG. 8 is a schematic circuit diagram of an array of optical sensing elements, showing the operation of switching circuitry in the array in a 2D imaging mode, in accordance with an embodiment of the invention.

FIG. 8 is a schematic circuit diagram showing the operation of switching circuitry 45 in a 2D imaging mode, in accordance with an embodiment of the invention. As in the preceding figures, FIG. 8 shows three sensing elements $PD_{i-1}$, $PD_i$, and $PD_{i+1}$ in a row of matrix 36. For 2D imaging, one switch TX of each sensing element PD is closed such that each sensing elements is connected individually to a single, respective neighboring storage node SN. Thus, the photocharge generated by each sensing element in response to incident radiation, shown by respective double wavy arrows 110, is collected in a storage node SN to the left of the sensing element. For example, for sensing element $PD_i$, switch $TX_{i-1}^R$ is closed, and the photocharge generated by sensing element $PD_i$ in response to incident radiation $110_i$ is collected in storage node $SN_{i-1}$, as shown by an arrow $112_{i-1}$. Similarly, the photocharge generated by sensing elements $PD_{i-1}$ and $PD_{i+1}$ is stored in storage nodes $SN_{i-2}$ and $SN_i$, respectively.

Thus, each storage node SN receives photocharge from only one sensing element PD, and each sensing element PD and its neighboring storage node define a corresponding pixel of the 2D image, with an image resolution of N×M. The choice of storing the generated photocharge to a storage node to the left of the sensing element is arbitrary, and the storage node to the right of each sensing element could as well have been chosen.

FIG. 9 is a schematic circuit diagram showing an example implementation of sensing elements PD and associated circuitry 120 in image sensor 37, in accordance with an embodiment of the invention. In this example, sensing elements PD are implemented as fully depleted pinned photodiodes, providing full charge transfer to selected storage nodes $SN_i$ when the appropriate transfer switches $TX_i^L$ or $TX_i^R$ are activated. (Storage nodes $SN_i$ and transfer switches $TX_i^L$ or $TX_i^R$ are selected as previously described in the context of FIGS. 3a-3b and 8.) Similarly, each storage node $SN_i$ is implemented in a way that provides full charge transfer to the respective floating diffusion $FD_i$ when transfer gate $TRF_i$ to the floating diffusion is activated. Circuitry 120 comprises sensing elements $PD_i$ and $PD_{i+1}$, along with switching circuitry 45 and readout circuitry 122 (labeled as readout circuitry $122_i$ and $122_{i+1}$ for storage nodes $SN_i$ and $SN_{i+1}$, respectively). The same notation and labelling are used as in FIGS. 2, 3a-3b, and 8.

Readout circuitry $122_i$ (and similarly readout circuitry $122_{i+1}$) comprises a floating diffusion node $FD_i$, which is connected to storage node $SN_i$ through a transfer gate $TRF_i$. Floating diffusion node $FD_i$ is also connected via a reset gate $RST_i$ to a reset voltage $V_{pix}$ and to the gate of a source follower $SF_i$. The source and drain of source follower $SF_i$ are connected between a baseline voltage $V_{DD}$ and a column line $124_i$ via a row select gate $RS_i$. Column line $124_i$ is connected to output stored charges (or digital values of stored charge) to control circuitry 22.

Photocharges generated by sensing elements $PD_i$ and $PD_{i+1}$ are collected to one or both of storage nodes $SN_i$ and $SN_{i+1}$, as shown in FIGS. 3a-3b and FIG. 8. From storage node $SN_i$ (and similarly from storage node $SN_{i+1}$), the photocharge is transferred to floating diffusion node $FD_i$ by actuating transfer gate $TRF_i$, which generates a voltage at the gate of source follower $SF_i$. Prior to transferring the collected photocharge from storage node $SN_i$ to the corresponding floating diffusion node $FD_i$, control circuitry 22 actuates reset gate $RST_i$ in order to reset the floating diffusion node to reset voltage $V_{pix}$. Following the transfer of the photocharge from storage node $SN_i$, reset voltage $V_{pix}$ of floating diffusion $FD_i$ is subtracted from the voltage generated by the transferred photocharge at the floating diffusion node, thus providing compensation for KTC noise injected into the floating diffusion node during the reset operation.

Reset of floating diffusion nodes FD and charge transfer from storage nodes SN is performed simultaneously for an entire row of matrix 80 of sensing elements (FIG. 4a) or group of sensing elements in the row. When control circuitry 22 actuates row select gate $RS_i$, a current source $126_i$ drives a current through source follower $SF_i$, and a signal from the gate of source follower $SF_i$ is transferred to column line $124_i$ for further processing. Readout of the entire matrix 80 is performed sequentially, row by row.

After the photocharge has been transferred from sensing element $PD_i$ to storage node $SN_i$, any residual charge from the sensing element is drained to common drain 66 by actuating shutter gate $SG_i$. Sensing element $PD_{i+1}$ is drained in a similar way.

The structure of image sensor 37 in the disclosed embodiments enables the image sensor to be operated, in both 2D imaging and 3D mapping, in a global shutter mode, wherein the acquisition of charges in storage nodes SN is performed simultaneously for all (or one or more groups of) sensing elements in matrix 80. It also enables operating image sensor 37 in a rolling shutter mode, as well as in a mode combining a rolling shutter and a global shutter.

As compared to 2D global-shutter image sensors that are known in the art, circuitry 120 includes one additional transistor per sensing element PD. However, as compared to commonly used iTOF circuits, each sensing element PD in circuitry 120 requires one less transistor and one less storage node. This feature enables the fabrication of smaller iTOF sensor elements, which can also provide high-resolution 2D imaging using these sensors.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for optical sensing, comprising:
   a semiconductor substrate;
   a first matrix of optical sensing elements, arranged on the substrate in rows and columns such that any given sensing element within any given row of the first matrix has first and second neighboring sensing elements disposed on opposing sides of the given sensing element along the given row in the first matrix;
   a second matrix of storage nodes, arranged on the substrate and interleaved with the sensing elements along the rows of the first matrix such that respective first and second storage nodes in the second matrix are disposed in proximity to each of the sensing elements within the first matrix;
   switching circuitry configured to couple each of the sensing elements to transfer photocharge to the respective first and second storage nodes;
   control circuitry, which is configured to control the switching circuitry in a depth sensing mode such that over a series of detection cycles comprising at least first and second detection intervals in each cycle, each of the sensing elements and the first neighboring sensing element are connected together to the respective first storage node during the first detection interval, and each of the sensing elements and the second neighboring sensing element are connected together to the respective second storage node during the second detection interval; and
   readout circuitry, which is configured to output the photocharge from the storage nodes.

2. The apparatus according to claim 1, and comprising:
   an illumination assembly, which is configured to direct optical radiation toward a target scene while modulating the optical radiation with a carrier wave having a predetermined carrier frequency; and
   objective optics, which are configured to image the target scene onto the first matrix of optical sensing elements,
   wherein the control circuitry is configured to synchronize the detection cycles with the carrier frequency.

3. The apparatus according to claim 2, wherein the control circuitry is configured to compare the photocharge output by the readout circuitry from the first and second storage nodes in order to compute depth coordinates of points in the target scene.

4. The apparatus according to claim 3, wherein the control circuitry is configured to vary respective phases of the first and second detection intervals relative to the carrier wave over the series of the detection cycles, and to compute the depth coordinates using the photocharge output over the varying phases.

5. The apparatus according to claim 4, wherein the first and second detection intervals have phases that are 180° apart relative to the carrier wave.

6. The apparatus according to claim 5, wherein the control circuitry is configured to control the switching circuitry so that the first and second detection intervals have phases of 0° and 180° relative to the carrier wave, and so that the storage nodes in at least some of the rows in the matrix collect the photocharge in third and fourth detection intervals having phases of 90° and 270° relative to the carrier wave.

7. The apparatus according to claim 5, wherein the control circuitry is configured to control the switching circuitry so that the first and second detection intervals have phases of 0° and 180° relative to the carrier wave, and so that the storage nodes in at least some of the rows in the matrix collect the photocharge in third, fourth, fifth and sixth detection intervals having phases of 60°, 120°, 240° and 300° relative to the carrier wave.

8. The apparatus according to claim 5, wherein the phases of the first and second detection intervals are reversed from row to row in successive rows of the second matrix.

9. The apparatus according to claim 1, wherein the control circuitry is further configured to control the switching circuitry in a two-dimensional (2D) sensing mode such that each of the sensing elements is connected individually to a single, respective one of the storage nodes that is in proximity thereto.

10. The apparatus according to claim 9, wherein the switching circuitry comprises shutter gates coupled to apply a global shutter to the sensing elements in the 2D sensing mode.

11. The apparatus according to claim 1, wherein the switching circuitry comprises first and second transfer switches coupled respectively between each of the sensing elements and the respective first and second storage nodes.

12. A method for optical sensing, comprising:
arranging a first matrix of optical sensing elements on a semiconductor substrate in rows and columns such that any given sensing element within any given row of the first matrix has first and second neighboring sensing elements disposed on opposing sides of the given sensing element along the given row in the first matrix;
arranging a second matrix of storage nodes on the substrate, interleaved with the sensing elements along the rows of the first matrix, such that respective first and second storage nodes in the second matrix are disposed in proximity to each of the sensing elements within the first matrix;
coupling each of the sensing elements to transfer photocharge via switching circuitry to the respective first and second storage nodes;
controlling the switching circuitry in a depth sensing mode such that over a series of detection cycles comprising at least first and second detection intervals in each cycle, each of the sensing elements and the first neighboring sensing element are connected together to the respective first storage node during the first detection interval, and each of the sensing elements and the second neighboring sensing element are connected together to the respective second storage node during the second detection interval; and
outputting the photocharge from the storage nodes.

13. The method according to claim 12, and comprising:
directing optical radiation toward a target scene while modulating the optical radiation with a carrier wave having a predetermined carrier frequency;
imaging the target scene onto the first matrix of optical sensing elements; and
synchronizing the detection cycles with the carrier frequency.

14. The method according to claim 13, and comprising comparing the photocharge output from the first and second storage nodes in order to compute depth coordinates of points in the target scene.

15. The method according to claim 14, wherein synchronizing the detection cycles comprises varying respective phases of the first and second detection intervals relative to the carrier wave over the series of the detection cycles, and comparing the photocharge comprises computing the depth coordinates using the photocharge output over the varying phases.

16. The method according to claim 12, and comprising controlling the switching circuitry in a two-dimensional (2D) sensing mode such that each of the sensing elements is connected individually to a single, respective one of the storage nodes that is in proximity thereto.

17. The method according to claim 16, wherein controlling switching circuitry comprises applying a global shutter to the sensing elements in the 2D sensing mode.

18. The method according to claim 12, wherein the switching circuitry comprises first and second transfer switches coupled respectively between each of the sensing elements and the respective first and second storage nodes.

* * * * *